United States Patent [19]
Otto

[11] Patent Number: 4,955,724
[45] Date of Patent: Sep. 11, 1990

[54] FOOD PROCESSING MACHINE

[75] Inventor: Friedrich Otto, Hameln, Fed. Rep. of Germany

[73] Assignee: A. Stephan u. Soehne GmbH & Co., Hameln, Fed. Rep. of Germany

[21] Appl. No.: 387,494

[22] Filed: Jul. 31, 1989

[30] Foreign Application Priority Data

Aug. 2, 1988 [DE] Fed. Rep. of Germany ... 8809812[U]

[51] Int. Cl.$^5$ .............................................. B01F 7/16
[52] U.S. Cl. ...................................... 366/314; 277/95; 277/206 R; 366/331; 366/349
[58] Field of Search ............... 366/275, 279, 314, 331, 366/347, 349, 295, 293; 99/348, 455; 277/58, 138, 95, 206 R, 81 R; 241/282.1

[56] References Cited

U.S. PATENT DOCUMENTS

| | | | |
|---|---|---|---|
| 2,746,779 | 5/1956 | Lobanoff | 366/331 |
| 3,101,200 | 8/1963 | Tracy | 277/81 |
| 3,285,278 | 11/1966 | Corlett | 277/206 |
| 3,612,546 | 10/1971 | Otto | 277/58 |
| 4,124,310 | 11/1978 | Brackman et al. | 366/314 |
| 4,149,271 | 4/1979 | Uibel et al. | 366/314 |
| 4,311,315 | 1/1982 | Kronenborg | 277/95 |
| 4,384,788 | 5/1983 | Lenart et al. | 366/349 |
| 4,609,156 | 9/1986 | Boele | 366/331 |
| 4,728,198 | 3/1988 | Maekawa | 366/279 |
| 4,863,278 | 9/1989 | Otto | 366/314 |

Primary Examiner—Timothy F. Simone
Attorney, Agent, or Firm—Foley & Lardner, Schwartz, Jeffery, Schwaab, Mack, Blumenthal & Evans

[57] ABSTRACT

The invention relates to a machine for the processing of foodstuffs or for the preparation of liquid or pasty pharmaceutical and chemical products, with a bowl, through the bowl bottom of which there leads a motor shaft, protruding perpendicularly into the bowl, of a motor arranged underneath the bowl, and with a shaft seal sealing off the motor shaft vacuum-tightly from the bowl bottom.

A cap-shaped seal support is pushed onto the free end of the motor shaft and resets underneath the fitted bowl on a shoulder of the motor shaft and engages at a clear distance labyrinth-like with a lower peripheral cap rim over a stationary housing ring enclosing the motor shaft. The seal support is pushed over and contacts an O-ring which lies in an annular groove of the motor shaft. In the upper section of the seal support, a V-ring is loosely inserted as a sealing ring, and encloses the shaft passage in the bowl bottom with an upper V-member. With fitted bowl, the V-ring is seated under radial prestress vacuum-tightly on the motor shaft and bears with its upper V-member under axial stress against the underside of the bowl bottom.

4 Claims, 2 Drawing Sheets

FOOD PROCESSING MACHINE

BACKGROUND OF THE INVENTION

The invention relates to a machine for the processing of foodstuffs or for the preparation of liquid or pasty pharmaceutical and chemical products. More particularly, the invention relates to a machine with a bowl, through the bottom of which bowl there leads a motor shaft, protruding perpendicularly into the bowl, of a motor arranged underneath the bowl, and with a shaft seal which seals off the motor shaft vacuum-tightly from the bowl bottom.

Such an embodiment can be taken from U.S. Pat. No. 3,612,546. Here, the shaft seal consists of two lip seals arranged one after the other and a cover plate fixed on the inside of the bowl wall, the two lip seals being fitted into the cover plate, which is designed as a sealing flange and is screwed with a neck bearing an external thread into the bowl wall. The two lip seals consist of a cap-type gasket and a retaining ring, which are seated in the neck of the sealing flange and form a constructional unit with the latter. The cap-type gasket lies with its cap rim against the shoulder of a ring fixed by press fitting in the neck of the sealing flange and is held in this position by the retaining ring pressed into the ring. The sealing flange is screwed with its neck into a threaded ring, which penetrates the bowl wall and bears against the latter from outside with a shoulder.

SUMMARY OF THE INVENTION

Accordingly, it is an object of the present invention to provide a shaft seal for a machine of the type described above which is simpler and less expensive to manufacture, and easier to handle.

In accomplishing the foregoing and other objectives, there has been provided, in accordance with one aspect of the present invention, a machine for the processing of foodstuffs or for the preparation of liquid or pasty pharmaceutical and chemical products comprising: a bowl with a bottom having a shaft passage passing therethrough; a motor having a motor shaft with a free end, a shoulder and an annular groove adjacent to the shoulder and located between the free end and the shoulder, wherein the motor shaft protrudes through the shaft passage perpendicularly to the bottom of the bowl; a housing ring enclosing the motor shaft; an O-ring disposed around the motor shaft within the annular groove; a cap-shaped seal support with an upper section having a recess therein and a lower peripheral cap rim engaging in labyrinth fashion at a clear distance the housing ring; and a V-ring seated in the recess in tight contact with the motor shaft and having an upper V-member and a lower V-member, wherein the seal support is fitted around the motor shaft under the bowl such that the seal support surrounds the annular groove, rests on the shoulder and contacts the O-ring, and wherein the upper V-member of the V-ring encloses the shaft passage in the bottom of the bowl and fits against the underside of the bottom of the bowl under axial stress.

Other objects, features and advantages of the present invention will become apparent to those skilled in the art from the following detailed description. It should be understood, however, that the detailed description and specific examples, while indicating preferred embodiments of the present invention, are given by way of illustration and not limitation. Many changes and modifications within the scope of the present invention may be made without departing from the spirit thereof, and the invention includes all such modifications.

BRIEF DESCRIPTION OF THE DRAWINGS

An embodiment of the invention serving as an example is represented in the drawing, in which.

DETAILED DESCRIPTION OF THE PREFERRED EMBODIMENTS

Figure 1:
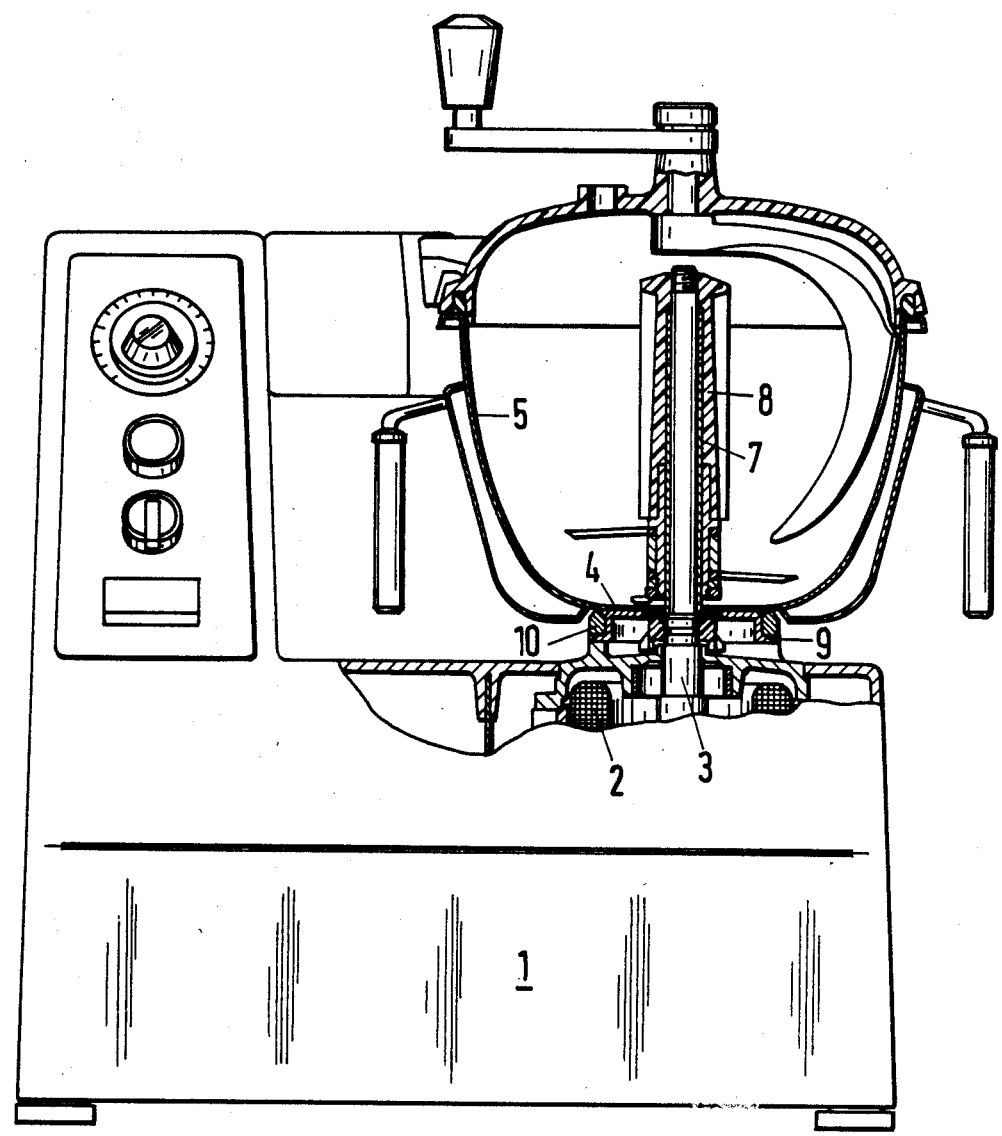
FIG. 1 shows a universal machine in front view and partly in longitudinal section and FIG. 2 shows a detail of FIG. 1 on an enlarged scale.
Figure 2:
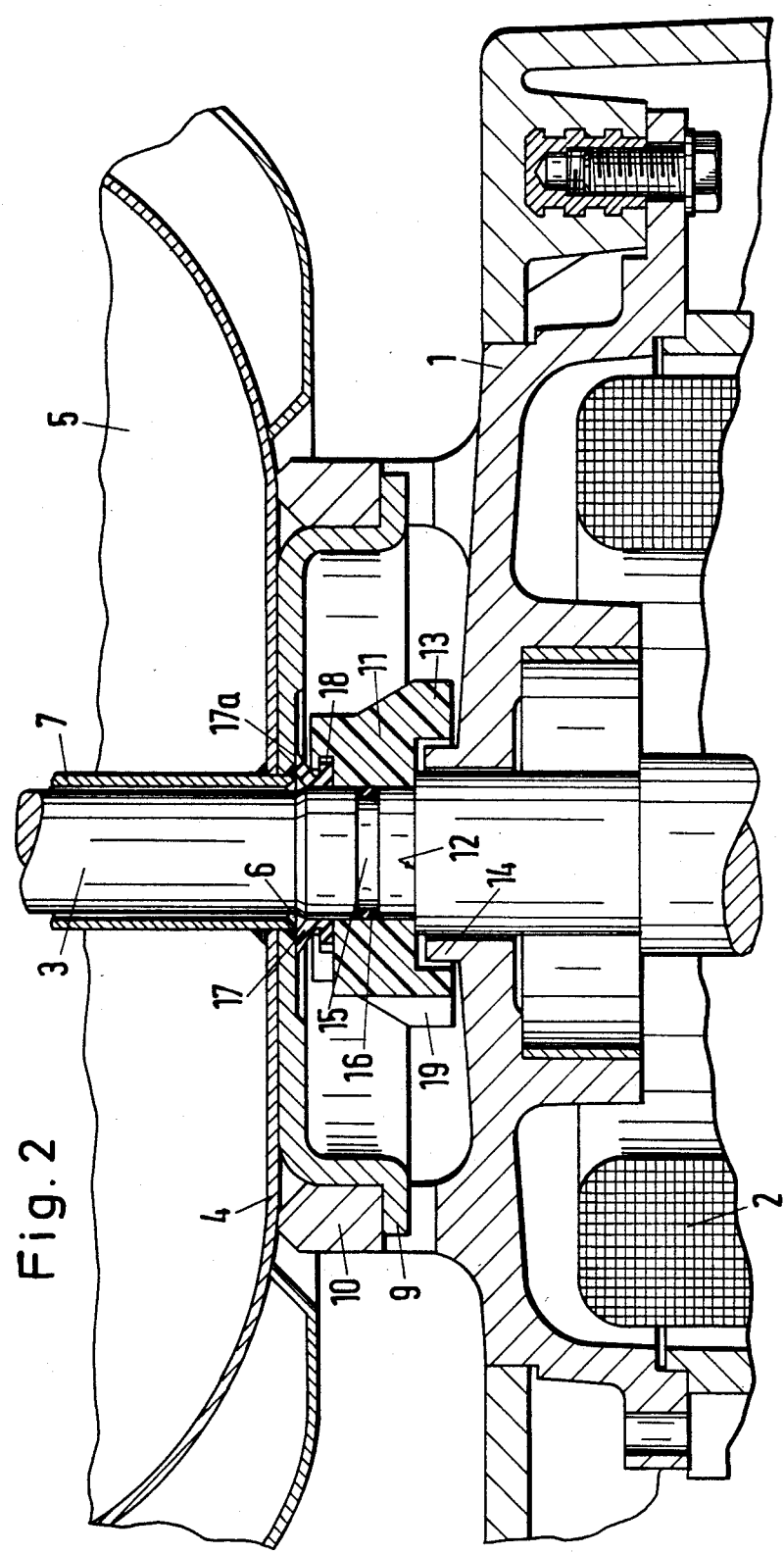

The motor shaft and bowl seal according to the invention has a particularly simple design. It is simple to handle, inexpensive in production and makes a simple pulling off and lifting on of the bowl possible. It is expedient if the V-ring is pushed loosely with its lower V-member into a radially inwardly open annular groove of the seal support.

Turning now to the drawings, the machine shown consists of a stand 1, which encloses inter alia a motor 2, the motor shaft 3 of which is led centrally through the bowl bottom 4 of a bowl 5 and protrudes perpendicularly upwards into this bowl 5. Welded into the shaft passage 6 of the bowl bottom 4 is a vertical pipe 7, which is encased without contact by a tool support 8, which is fitted fixedly in terms of rotation on the upper free end of the motor shaft 3. The vertical pipe 7 projects beyond the greatest possible filling level within the bowl 5.

The bowl 5 is fixed easily detachably on the stand 1 by means of a bayonet closure. Provided for this purpose on the bowl bottom 4 are angle-shaped coupling pieces 9, which engage in perpendicularly running guide grooves in the stand 1 (not shown in any more detail) when the bowl 5 is fitted on perpendicularly, in order then to engage underneath a catch 10 in each case, provided on the stand 1, when the bowl 5 is turned about its center axis.

The motor shaft 3 is sealed off vacuum-tightly from the bowl bottom 4 by a shaft seal, which has the following design:

Pushed onto the free end of the motor shaft 3 is a cap-shaped seal support 11, preferably consisting of plastic, which rests underneath the fitted bowl 5 on a shoulder 12 of the motor shaft 3 and engages at a clear distance labyrinth-like with a lower peripheral cap rim 13 over a stationary housing ring 14 of the stand 1 enclosing the motor shaft 3. In so doing, the seal support 11 is pushed over an O-ring 16 lying in an annular groove 15 of the motor shaft 3. In the upper section of the seal support 11, a V-ring 17 is pushed loosely with its lower V-member into a radially inwardly open annular groove 18 of the seal support 11. The upper V-member 17a encloses the shaft passage 6 in the bowl bottom 4 and, with fitted bowl 5, under axial stress fits against the underside of the bowl bottom 4. Furthermore, with fitted bowl 5, the V-ring 17 is seated under radial prestress vacuum-tightly on the motor shaft 3.

The seal support 11 has on its outer jacket at least one, but preferably at least two, approximately perpendicular centrifugal ribs 19.

It can be seen that the bowl 5 can, after corresponding turning about its center axis, be detached from the stand 1 and pulled off the motor shaft 3 upwards in a simple way. This only involves a relief of the V-ring 17, but no sliding relative displacement between the bowl bottom 4 or its vertical pipe 7 and a seating ring 16, 17. Simply fitting on the bowl 5 and locking it to the stand 1 causes an axially directed load to be imposed on the upper V-member 17a; this lip is thereby pressed underneath the bowl bottom 4 and seals off from a vacuum which may be present in the bowl 5. Thus, by simply fitting on the bowl 5 and locking it, a vacuum seal is automatically established (again).

The V-ring is to be regarded as a wearing part and can only be exchanged if the complete seal support 11 is pulled off upwards over the motor shaft 3. With pushed-on seal support 11, consequently the V-ring 17 also cannot be lost when the bowl 5 is removed.

The seal support 11 forms a labyrinth with respect to the stationary housing ring 14 in order to protect the normally perpendicularly arranged motor 2 against the ingress of water, to be precise both when the motor is running and when it is at a standstill. The centrifugal rib 19 ensures that water or other liquid is thrown out radially during the rotation of the motor shaft 3. The seal support 11 can be fitted and removed easily and, due to the commercially available O-ring 16 provided, is seated firmly and vacuum-tightly on the motor shaft 3. The V-ring 17 can also be fitted or removed easily after pulling off the seal support 11. In the fitted state, the V-ring 17 is seated vacuum-tightly on the motor shaft by corresponding prestress.

The motor shaft and bowl seal according to the invention can thus be handled easily and produced inexpensively.

What is claimed is:

1. A machine for the processing of foodstuffs or for the preparation of liquid or pasty pharmaceutical and chemical products comprising:

a bowl with a bottom having a shaft passage passing therethrough;

a motor having a motor shaft with a free end, a shoulder and an annular groove adjacent to said shoulder and located between said free end and said shoulder, wherein said motor shaft protrudes through said shaft passage perpendicularly to said bottom of said bowl;

a housing ring enclosing said motor shaft;

an O-ring disposed around said motor shaft within said annular groove;

a cap-shaped seal support with an upper section having a recess therein and a lower peripheral cap rim engaging in labyrinth fashion at a clear distance said housing ring; and a V-ring seated in said recess in tight contact with said motor shaft and having an upper V-member and a lower V-member, wherein said seal support is fitted around said motor shaft under said bowl such that said seal support surrounds said annular groove, rests on said shoulder and contacts said O-ring, and wherein said upper V-member of said V-ring encloses said shaft passage in said bottom of said bowl and fits against the underside of said bottom of said bowl under axial stress.

2. The machine as claimed in claim 1, wherein said recess is a radially inwardly open annular groove into which said lower V-member of said V-ring is disposed.

3. The machine as claimed in claim 1, wherein the seal support has at least one approximately perpendicular centrifugal rib on its outer jacket.

4. The machine as claimed in claim 1, wherein the seal support comprises a plastic.

* * * * *